(12) United States Patent
Colace et al.

(10) Patent No.: US 7,043,483 B2
(45) Date of Patent: May 9, 2006

(54) SYSTEM AND METHOD ALLOWING ADVERTISERS TO MANAGE SEARCH LISTINGS IN A PAY FOR PLACEMENT SEARCH SYSTEM USING GROUPING

(75) Inventors: Ann-Bettina Colace, Toluca Lake, CA (US); Scott W. Snell, Hollywood, CA (US); Jeremy Daw, Alta Loma, CA (US); Dominic Dough-Ming Cheung, South Pasadena, CA (US); Benjamin James Watkins, Torrance, CA (US); Thomas A. Soulanille, Pasadena, CA (US); Matthew S. Ropp, Los Angeles, CA (US); Gabriel Graham, Pasadena, CA (US); Peng Zhao, Alhambra, CA (US); Kenneth A. Kharma, Pasadena, CA (US); Susan Florence Phillips, Los Angeles, CA (US)

(73) Assignee: Overture Services, Inc., Pasadena, CA (US)

( * ) Notice: Subject to any disclaimer, the term of this patent is extended or adjusted under 35 U.S.C. 154(b) by 0 days.

(21) Appl. No.: 10/863,876

(22) Filed: Jun. 8, 2004

(65) Prior Publication Data

US 2004/0260689 A1 Dec. 23, 2004

Related U.S. Application Data

(63) Continuation of application No. 09/994,912, filed on Nov. 13, 2001, now Pat. No. 6,826,572.

(51) Int. Cl.
G06F 17/30 (2006.01)

(52) U.S. Cl. .................. 707/10; 707/3; 705/1
(58) Field of Classification Search .................. 707/10, 707/5, 3, 4; 705/1, 26, 27
See application file for complete search history.

(56) References Cited

U.S. PATENT DOCUMENTS

| 5,659,732 A | 8/1997 | Kirsch ............................ 707/5 |
| 5,717,923 A | 2/1998 | Dedrick ...................... 707/102 |
| 5,724,424 A | 3/1998 | Gifford ......................... 705/79 |
| 5,724,521 A | 3/1998 | Dedrick ........................ 705/26 |
| 5,724,524 A | 3/1998 | Hunt et al. ................... 705/26 |
| 5,748,954 A | 5/1998 | Mauldin ....................... 707/10 |
| 5,752,238 A | 5/1998 | Dedrick ........................ 705/14 |

(Continued)

FOREIGN PATENT DOCUMENTS

| EP | 1 282 051 A1 | 2/2003 |
| EP | 1 282 059 A1 | 2/2003 |
| JP | 2001-250052 | 9/2001 |
| WO | WO 99/44156 A1 | 9/1999 |
| WO | WO 0073960 A1 | 12/2000 |
| WO | WO 01/55929 A1 | 8/2001 |

OTHER PUBLICATIONS

Office Action dated May 2, 2005 from counterpart Korean application number 2005–019920057 and letter dated May 26, 2005 from Kim & Chang with English language translation thereof.

*Primary Examiner*—Greta Robinson
(74) *Attorney, Agent, or Firm*—Brinks Hofer Gilson & Lione

(57) ABSTRACT

A system for advertisers to efficiently manage their search listings in placement database search system includes grouping means for managing multiple categories for the search listings and query means for searching search listings. The system further includes quick-fill means for modifying an attribute in plurality of search listings by specifying the modification at single location.

14 Claims, 17 Drawing Sheets

U.S. PATENT DOCUMENTS

| | | | |
|---|---|---|---|
| 5,768,521 A | 6/1998 | Dedrick | 705/26 |
| 5,778,367 A | 7/1998 | Wesinger, Jr. et al. | 707/10 |
| 5,794,210 A | 8/1998 | Goldhaber et al. | 705/14 |
| 5,826,241 A | 10/1998 | Stein et al. | 705/26 |
| 5,848,397 A | 12/1998 | Marsh et al. | 705/14 |
| 5,848,407 A | 12/1998 | Ishikawa et al. | 707/2 |
| 5,852,820 A | 12/1998 | Burrows | 707/2 |
| 5,855,008 A | 12/1998 | Goldhaber et al. | 705/14 |
| 5,862,223 A | 1/1999 | Walker et al. | 705/50 |
| 5,864,845 A | 1/1999 | Voorhees et al. | 707/5 |
| 5,864,846 A | 1/1999 | Voorhees et al. | 705/44 |
| 5,903,882 A | 5/1999 | Asay et al. | 705/44 |
| 5,918,014 A | 6/1999 | Robinson | 709/219 |
| 5,920,854 A | 7/1999 | Kirsch et al. | 707/3 |
| 5,920,859 A | 7/1999 | Li | 707/5 |
| 6,078,866 A | 6/2000 | Buck et al. | 702/2 |
| 6,253,188 B1 * | 6/2001 | Witek et al. | 705/14 |
| 6,269,361 B1 | 7/2001 | Davis et al. | 707/3 |
| 6,285,987 B1 | 9/2001 | Roth et al. | 705/27 |
| 6,725,214 B1 * | 4/2004 | Garcia-Chiesa | 707/3 |
| 6,826,572 B1 * | 11/2004 | Colace et al. | 707/10 |
| 2001/0044757 A1 | 11/2001 | Robb et al. | 705/27 |
| 2002/0004735 A1 | 1/2002 | Gross | 705/10 |
| 2002/0165849 A1 * | 11/2002 | Singh et al. | |
| 2002/0169760 A1 | 11/2002 | Cheung et al. | 707/3 |
| 2003/0050863 A1 | 3/2003 | Radwin | 705/27 |
| 2003/0093385 A1 | 5/2003 | Colace et al. | 705/64 |

* cited by examiner overture DirecTraffic Center®

| Main | Manage Bids | Reports | Manage Listings | Money Manager | Support Center | Power Manager |

Manage Categories | Add Listings

Aug 30 2001 15:28:34 PT

Account ID: 39233634127

This is your confirmation page. Please print this page for your records.

1002 Delete Listings  1004

| Search Term | URL |
|---|---|
| leather bomber jacket | http://www.shopross.com/catalog3051.html |
| leather coat | http://www.shopross.com/catalog3051.html |

Bid Changes  1006

| Search Term | URL | Current Bid |
|---|---|---|
| all leather jacket | http://www.shopross.com/catalog3051.html | $0.02 |
| biker jacket | http://www.shopross.com/catalog3051.html | $0.02 |
| cutlery | http://www.shopross.com/catalog2998.html | $0.05 |
| discount leather jacket | http://www.shopross.com/catalog3051.html | $0.03 |
| fillet knife | http://www.shopross.com/catalog2998.html | $0.05 |

Modified Listings

| Search Term | URL | Current Bid |
|---|---|---|
| fishing | http://www.shopross.com/catalog3051.html | $0.10 |
| fishing knife | http://www.shopross.com/catalog3051.html | $0.05 |
| fishing links | http://www.shopross.com/catalog2998.html | $0.01 |

[ OK ]

Main | Manage Bids | Reports | Manage Listings | Money Manager | Support Center | Power Manager

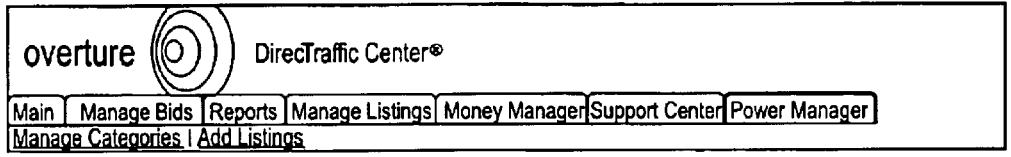

You chose to bid your selected listings to top.
A total of 2 listings will be bid to top.

Increase click-throughs with Bid to Top.
You have chosen to bid the listings you selected to the top of the search results. The higher your position in the search results, the more clicks your listings are likely to receive. Bid to Top allows you to move search listings to the top position quickly and easily. Choose one of the following options:

⦿ Bid to Top unlimited: We'll increase your bids so that your site on selected listings is at the top of every search term you selected. If your bids are currently below $0.05, this procedure will raise all bids to the $0.05 minimum. You will not be able to lower them later.

○ Bid to Top with a cap of: $ [      ]
We'll move all of your selected listings to the number-one position OR to your specified maximum bid amount (whichever costs less). You can only have one cap for all of your bids. For example: If you want to Bid to Top with a cap of $0.60, we will bid your search listings one cent higher than the current top bid to move your listings to the number-one position. If, however, there are any search listings where the top bid is greater than $0.60, we will only increase your bid to your cap amount of $0.60.

- Make sure there's enough money in your account to cover the increased traffic. By using Bid to Top, you will probably get more click-throughs to your site, and your funds will be exhausted more quickly.

- There is a $0.05 minimum bid requirement. If any of your search listings were created before March 1, 2001 and are below the $0.05 minimum, any bid change, such as using Bid to Top, will cause those listings to be subject to the $0.05 minimum.

- We cannot guarantee how long your listings will remain in the top position. As always, you could be outbid by another advertiser at any time.

- We perform the Bid to Top service upon request only. This service does not keep your listings at the top on an ongoing basis. If you wish to move your listings to the top again in the future, you must submit another Bid to Top request.

- Bid to Top requests are processed immediately on a first-come, first-served basis. We will send you a confirmation e-mail once your request has been processed.

Request more information.    [CANCEL] [SUBMIT]

Main | Manage Bids | Reports | Manage Listings | Money Manager | Support Center | Power Manager

SYSTEM AND METHOD ALLOWING ADVERTISERS TO MANAGE SEARCH LISTINGS IN A PAY FOR PLACEMENT SEARCH SYSTEM USING GROUPING

RELATED APPLICATIONS

This application is a continuation of application Ser. No. 09/994,912, filed Nov. 13, 2001 now U.S. Pat. No. 6,826,572, pending, which application is incorporated herein in its entirety by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO CD ROM APPENDIX

A compact disc appendix is included containing computer program code listings pursuant to 37 C.F.R. 1.52(e) and is hereby incorporated by reference in its entirety. The total number of compact discs is 1 including 30,071 files and 96,227,410 bytes. The files included on the compact disc are listed in a file entitled "dir_s" on the compact disc. Because of the large number of files contained on the compact disc, the required listing of file names, dates of creation and sizes in bytes is included in the file dir_s on the compact disk and incorporated by reference herein.

BACKGROUND

The Internet provides many databases of information accessible for searching and receiving information. Pay for placement database search systems have been developed in which advertisers bid on the placement of their listings in search results returned to a searcher in response to a world wide web query from a searcher. Each advertiser's listing includes a search term and a bid amount. In some embodiments, each advertiser's listing includes a title, descriptive text and a clickable hyperlink or uniform resource locator (URL). The database of search listings stores many such listings, each associated with an advertiser. Upon receipt of the query, the database is searched and listings having a search term matching the query are formatted for display to the searcher as search results.

The advertisers adjust their bids or bid amounts to control the position at which their search listings are presented in the search results. The pay for placement system places search listings having higher-valued bids higher or closer to the top of the search listings. Other rules may be applied as well when positioning search listings. For example, a more senior listing will be positioned or ranked higher than a junior listing for the same search term and same bid. Higher-ranked listings are seen by more searchers and are more likely to be clicked, producing traffic of potential customers to an advertiser's web site.

The searcher is presented with search listings according to the bid amounts. The search listings may extend over several screens or pages when formatted for viewing. As a result, higher positioned search listings are much more likely to be seen by the searcher. Moreover, some pay for placement systems have affiliate agreements whereby some of their highest-bidded search listings are presented to searchers using other general purpose search engines. Because of these affiliate agreements and similar arrangements, an advertiser's web site, if bid highly enough, may be seen by as many as seventy-five percent of Internet users.

An advertiser wishing to attract searchers to his web site as potential customers for the advertiser's goods and services thus has an incentive to position his search listing relatively high in the search results. An advertiser may enter bids on many search listings. For search listings which are closely related to the content of the advertiser's web site, the advertiser might place relatively large bids. For less closely related search listings, the advertiser might place smaller bids. A number of strategies have been developed by advertisers to increase traffic to advertiser web sites in this manner.

Similarly, pay for placement search systems have developed tools to help the advertisers manage their bids and attract traffic. Overture Services, Inc., operating a system at www.overture.com, has presented advertisers with a standard bidding page accessible over the world wide web.

Currently available web sites allow an advertiser to add search listings to the system. However, the conventional system neither allows grouping the search listings in the categories nor allows for mass update of the search listings by single operation.

Accordingly, there is a need for an improved system and method for managing listings in a pay for placement system.

BRIEF SUMMARY

By way of introduction only, the present embodiments provide a method and system for a pay for placement database search system. The method and system include grouping and querying, one or more search listings associated with an advertiser, providing the advertisers an ability to simultaneously modify plurality of search listings. The advertisers also possess means to search the categories and gather statistical data for entire category.

The foregoing discussion of the preferred embodiments has been provided only by way of introduction. Nothing in this section should be taken as a limitation of the claims, which define the scope of the invention.

BRIEF DESCRIPTION OF THE DRAWINGS

FIG. 10 is a screen shot of one embodiment of a 'Edit-Listings-receipt Interface Page', pointing to receipt displayed in response to a list modification;

FIG. 11 is a screen shot of one embodiment of a 'Listings wide Search', which is a typical Query page in the Listing View;

FIG. 12 is a screen shot of one embodiment of a 'Query Criteria Selection Interface Page', which is a typical Query page in the Bidding View;

FIG. 14 is a screen shot of one embodiment of a 'Bid-to-top select Interface Page' wherein the advertiser is able to bid all or some of the listings to the top;

FIG. 16 is a screen shot of one embodiment of a 'Numeric Comparison Operation Criteria for Bidding Interface Page', which displays the numeric comparison operators for Bidding Queries; and FIG. 17 is a screen shot of one embodiment of a 'Statistics Wide Search Interface Page' Bidding Interface Page', which displays a typical Query in the Statistics View.

DETAILED DESCRIPTION OF THE PRESENTLY PREFERRED EMBODIMENTS

Figure 1:
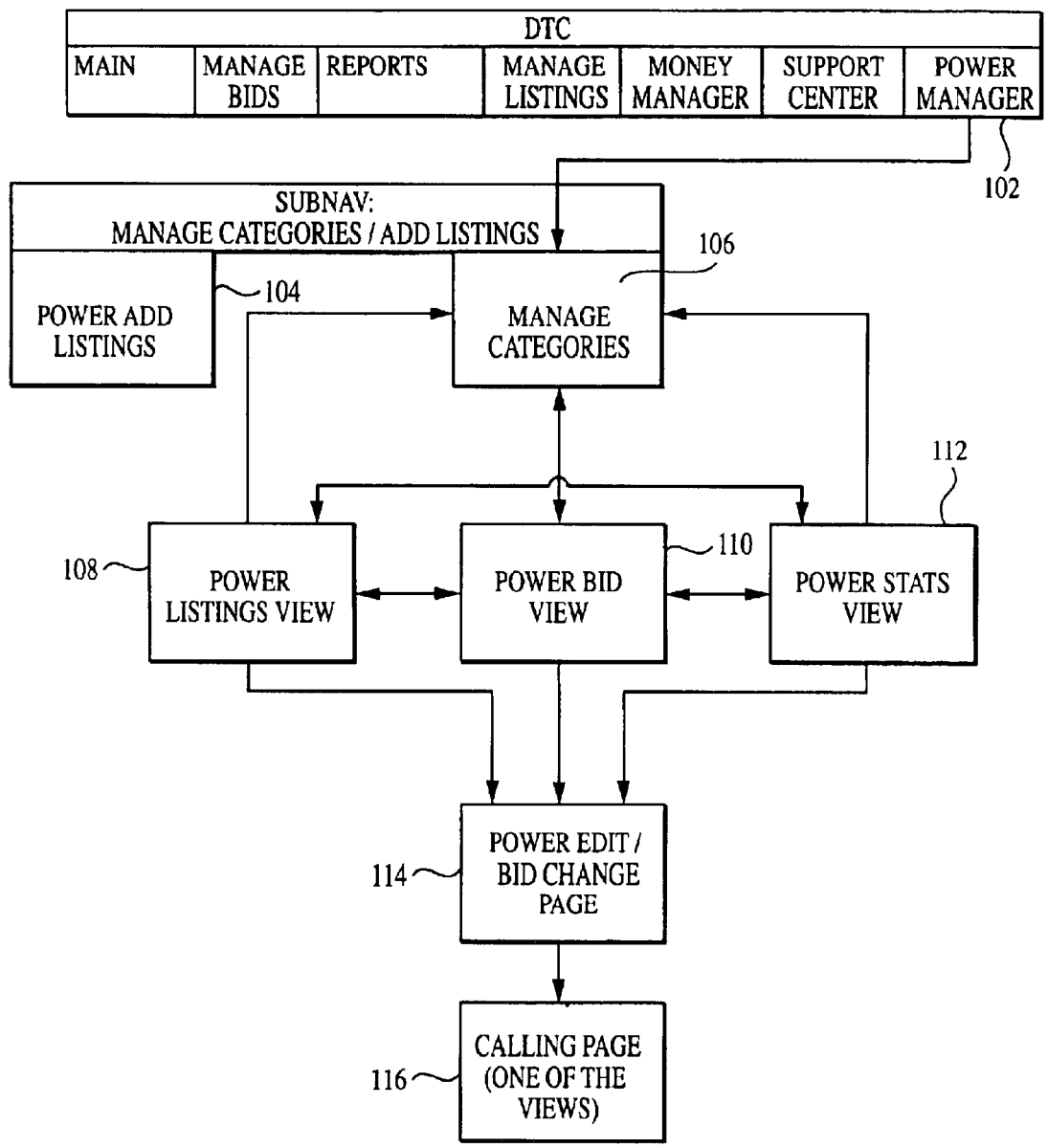
FIG. 1 illustrates a navigation map in the search listing management system in a pay for placement search system.

Referring now to the drawing, FIG. 1 illustrates the navigation map of a search listing management system which is referred to herein as "Power Manager." Power Manager may be implemented in a pay for placement database search system as described below in conjunction with FIG. 2. In the Power Manager tab 102, the advertiser can either choose to add search listings 104 or to Manage Categories 106. From Manage categories, the advertiser can go to Bid View 110. From Bid View, the advertiser can go to both Listings View 108 and Stat View 112, which provides statistics about search listings. While in one view, the advertiser can navigate to any of the other two views. All three views have ability to edit categories and add listing 114, All three Views have ability to take the advertiser back to Manage Categories page.

Figure 2:
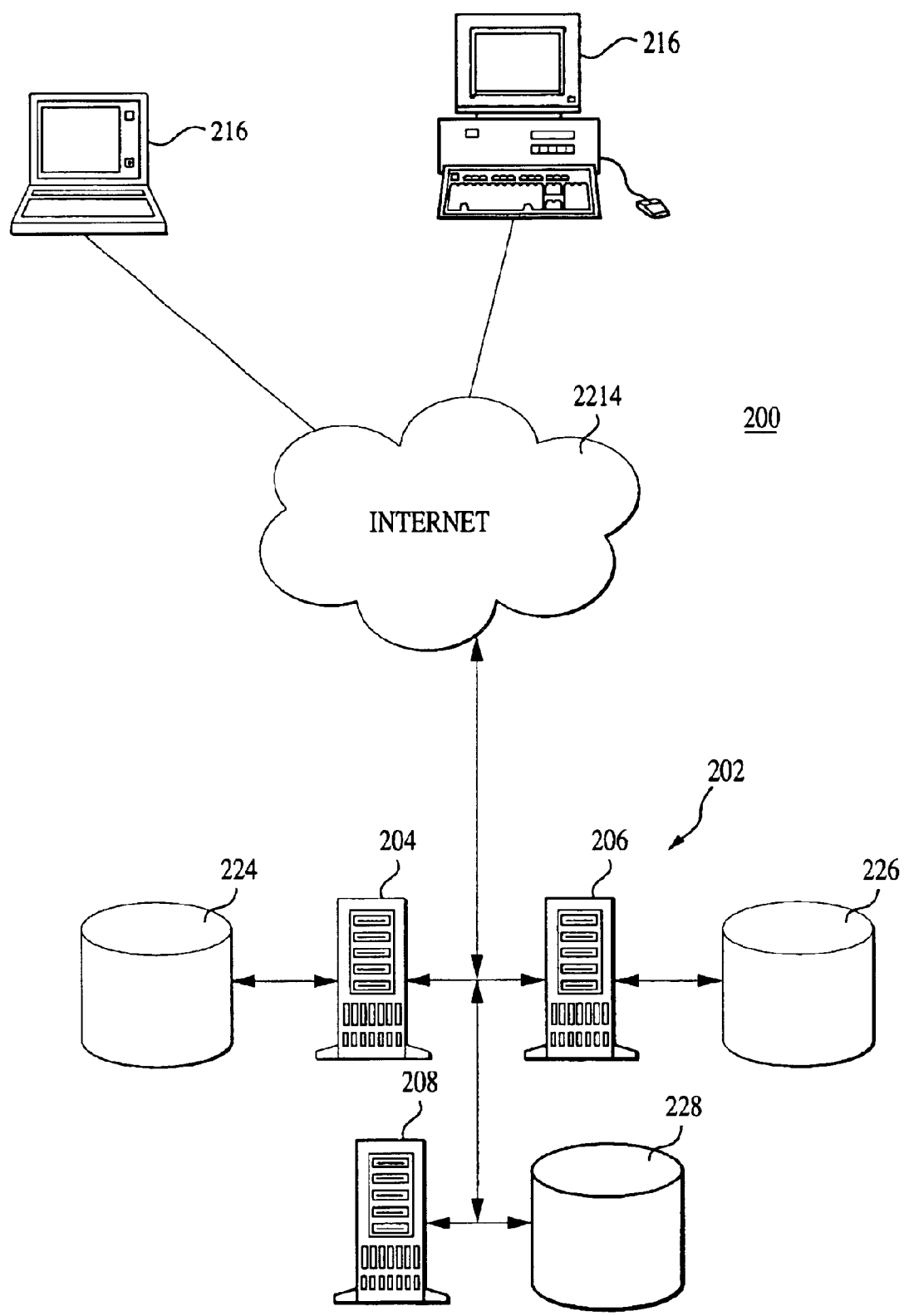
FIG. 2 is a block diagram of a pay for placement database search system.

FIG. 2 is a block diagram of a pay-for-placement search system 200. FIG. 2 is an example of a distributed system 200 configured as client/server architecture used in one embodiment of the present invention. A client is a member of a class or group that uses the services of another class or group to which it is not related. A server is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 2 therefore shows a distributed system 200 including a plurality of advertiser web servers 204 and associated database 224, an account management server 206 and associated database 226, and a search engine web server 208 and associated database 228, and a plurality of client computers 216 such as a searcher computer and an advertiser computer, all of which are connected to a network such as the Internet 214. The network 214 will be hereinafter generally referred to as the Internet. Although the system and method of the present invention is specifically useful for the Internet, it should be understood that the client computers 216, advertiser web servers 204, account management server 206, and search engine web server 208 may be connected together through one of a number of different types of networks. Such networks may include local area networks (LANs), other wide area networks (WANs), and regional networks accessed over telephone lines, such as commercial information services. The client and server processes may even comprise different programs executing simultaneously on a single computer. Advertiser web server 204, account management server 206, and search engine web server 208 and their associated storage device comprise a pay-for-placement database search system 202 as described herein.

The client computers 216 can be conventional personal computers (PCs), workstations, or computer systems of any other size. Each client 216 typically includes one or more processors, memories, input/output devices, and a network interface, such as a conventional modem or network interface card. The advertiser web servers 204, account management server 206, and the search engine web server 208 can be similarly configured. However, advertiser web servers 204, account management server 206, and search engine web server 208 may each include many computers connected by a separate private network.

The client computers 216 can execute web browser programs, such as the NAVIGATOR, EXPLORER, or MOSAIC browser programs, to locate the web pages or records stored on advertiser server 204. The browser programs allow the users to enter addresses of specific web pages to be retrieved. These addresses are referred to as Uniform Resource Locators, or URLs. In addition, once a page has been retrieved, the browser programs can provide access to other pages or records when the user "clicks" on hyperlinks to other web pages. Such hyperlinks are located within the web pages 30 and provide an automated way for the user to enter the URL of another page and to retrieve that page. The pages can be data records including as content plain textual information, or more complex digitally encoded multimedia content, such as software programs, graphics, audio signals, videos, and so forth.

In one embodiment, client computers 216 communicate through the network with various network information providers, including account management server 206, search engine server 208, and advertiser servers 204 using the functionality provided by a HyperText Transfer Protocol (HTTP), although other communications protocols, such as FTP, SNMP, TELNET, and a number of other protocols known in the art, may be used. Preferably, search engine server 208, account management server 206, and advertiser servers 204 are located on the World Wide Web.

As discussed above, at least two types of server are contemplated in the illustrated embodiment. The first server contemplated is an account management server 206 comprising a computer storage medium 220 and a processing system. A database is stored on the storage medium 220 of the account management server 206. The database contains advertiser account information. It will be appreciated from the description below that the system and method described herein may be implemented in software that is stored as executable instructions on a computer storage medium, such as memories or mass storage devices, on the account management server 206. Conventional browser programs, running on client computers 216, may be used to access advertiser account information stored on account management server 206. Preferably, access to the account management server 206 is accomplished through a firewall, not shown, which protects the account management and search result placement programs and the account information from external tampering. Additional security may be provided via enhancements to the standard communications protocols such as Secure HTTP or the Secure Sockets Layer.

The second server type contemplated is a search engine web server 208. A search engine program permits network users, upon navigating to the search engine web server URL or sites on other web servers capable of submitting queries to the search engine web server 208 through their browser program, to type keyword queries to identify pages of interest among the millions of pages available on the World Wide Web. In a preferred embodiment of the present invention, the search engine web server 208 generates a search result list that includes, at least in part, relevant entries obtained from and formatted by the results of the bidding process conducted by the account management server 206. The search engine web server 208 generates a list of hypertext links to documents that contain information relevant to search terms entered by the user at the client computer 216. The search engine web server transmits this list, in the form of a web page, to the network user, where it is displayed on the browser running on the client computer 216. One embodiment of the search engine web server may be found by navigating to the web page at URL http://www.overture.com/.

Search engine web server 208 is connected to the Internet 214. In one embodiment, search engine web server 208 includes a search database including search listing records used to generate search results in response to user queries. In addition, search engine web server 208 may also be connected to the account management server 206. Account management server 206 may also be connected to the Internet 214. The search engine web server 208 and the account management server 206 address the different information needs of the users located at client computers 216.

For example, one class of users located at client computers 216 may be network information providers such as advertising web site promoters or advertisers having advertiser web pages located on advertiser web servers 204. These advertising web site promoters or advertisers may wish to access account information residing in storage on account management server 206. An advertising web site promoter may, through the account residing on the account management server 206, participate in a competitive bidding process with other advertisers. An advertiser may bid on any number of search terms relevant to the content of the advertiser's web site. In one embodiment, the relevance of a bidded search term to an advertiser's web site is determined through a manual editorial process prior to insertion of the search listing containing the search term and advertiser web site URL into the database. In an alternate embodiment of the present invention, the relevance of a bidded search term in a search listing to the corresponding web site may be evaluated using a computer program executing at the processor of account management server 206, where the computer program will evaluate the search term and corresponding web site according to a set of predefined editorial rules.

The higher bids receive more advantageous placement on the search result list page generated by the search engine 208 when a search using the search term bid on by the advertiser is executed. In one embodiment, the amount bid by an advertiser comprises a money amount that is deducted from the account of the advertiser for each time the advertiser's web site is accessed via a hyperlink on the search result list page. Alternatively, the amount bit may comprise any economic value given by the advertiser. A searcher clicks on the hyperlink with a computer input device to initiate a retrieval request to retrieve the information associated with the advertiser's hyperlink. Preferably, each access or click on a search result list hyperlink will be redirected to the search engine web server 208 to associate the "click" with the account identifier for an advertiser. This redirect action, which is not apparent to the searcher, will access account identification information coded into the search result page before accessing the advertiser's URL using the search result list hyperlink clicked on by the searcher. The account identification information is recorded in the advertiser's account along with information from the retrieval request as a retrieval request event. Since the information obtained through this mechanism conclusively matches an account identifier with a URL in a manner not possible using conventional server system logs known in the art, accurate account debit records will be maintained. The advertiser's web site description and hyperlink on the search result list page is accompanied by an indication that the advertiser's listing is a paid listing. Each paid listing displays a cost to advertiser, which is an amount corresponding to a price-per-click paid by the advertiser for each referral to the advertiser's site through the search result list.

A second class of users at client computers 216 may comprise searchers seeking specific information on the web. The searchers may access, through their browsers, a search engine web page residing on web server 208. The search engine web page includes a query box in which a searcher may type a search term comprising one or more keywords. Alternatively, the searcher may query the search engine web server 208 through a query box hyperlinked to the search engine web server 208 and located on a web page stored at a remote web server. When the searcher has finished entering the search term, the searcher may transmit the query to the search engine web server 208 by clicking on a provided hyperlink. The search engine web server 208 will then generate a search result list page and transmit this page to the searcher at the client computer 216.

The searcher may click on the hypertext links associated with each listing on the search results page to access the corresponding web pages. The hypertext links may access web pages anywhere on the Internet 214, and include paid listings to advertiser web pages located on advertiser web servers 204. In one embodiment, the search result list also includes non-paid listings that are not placed as a result of advertiser bids and are generated by a conventional World Wide Web search engine, such as the INKTOMI, LYCOS, or YAHOO! search engines. The non-paid hypertext links may also include links manually indexed into the database by an editorial team. Most preferably, the non-paid listings follow the paid advertiser listings on the search results page.

In another embodiment, the users at client computers 216 may access the web site of other web service providers affiliated with the operator of the pay for placement search system 200. Under affiliate agreements, search queries entered by the users at the client computers 216 using web pages of the affiliated web service providers are also passed to the search engine web server 208. The search engine web server 208 produces pay for placement search results as described herein. Some of the pay for placement search results are passed back to the user at the client computer and combined with other search results to form query results. Under an affiliate agreement, the pay for placement search results may be positioned in any suitable location in the query results. If the user clicks on one of the pay for placement search results, economic value is generated for the pay for placement search system 200 or for the affiliated web service provider, or both.

Preferably, from the perspective of the operator of the pay for placement search system 200, under the affiliate agreement the pay for placement search results are positioned or ranked near or at the top of the query results sent to the user. Search listings treated this way are referred to as premium listings. In one example, the premium listings are the top three search listings for a search term and are passed to the affiliated web service provider and displayed in the top three positions of the query results. A premium listing has an increased likelihood of being clicked by the user. In this manner, an advertiser's premium search listing will be seen by a larger number of searchers using the World Wide Web, increasing the traffic to the advertiser's web site. This increases the incentive for the advertiser to submit bids to position the advertiser's search listings as premium search listings, with a rank or position which will ensure display near the top of the query results.

Figure 3:
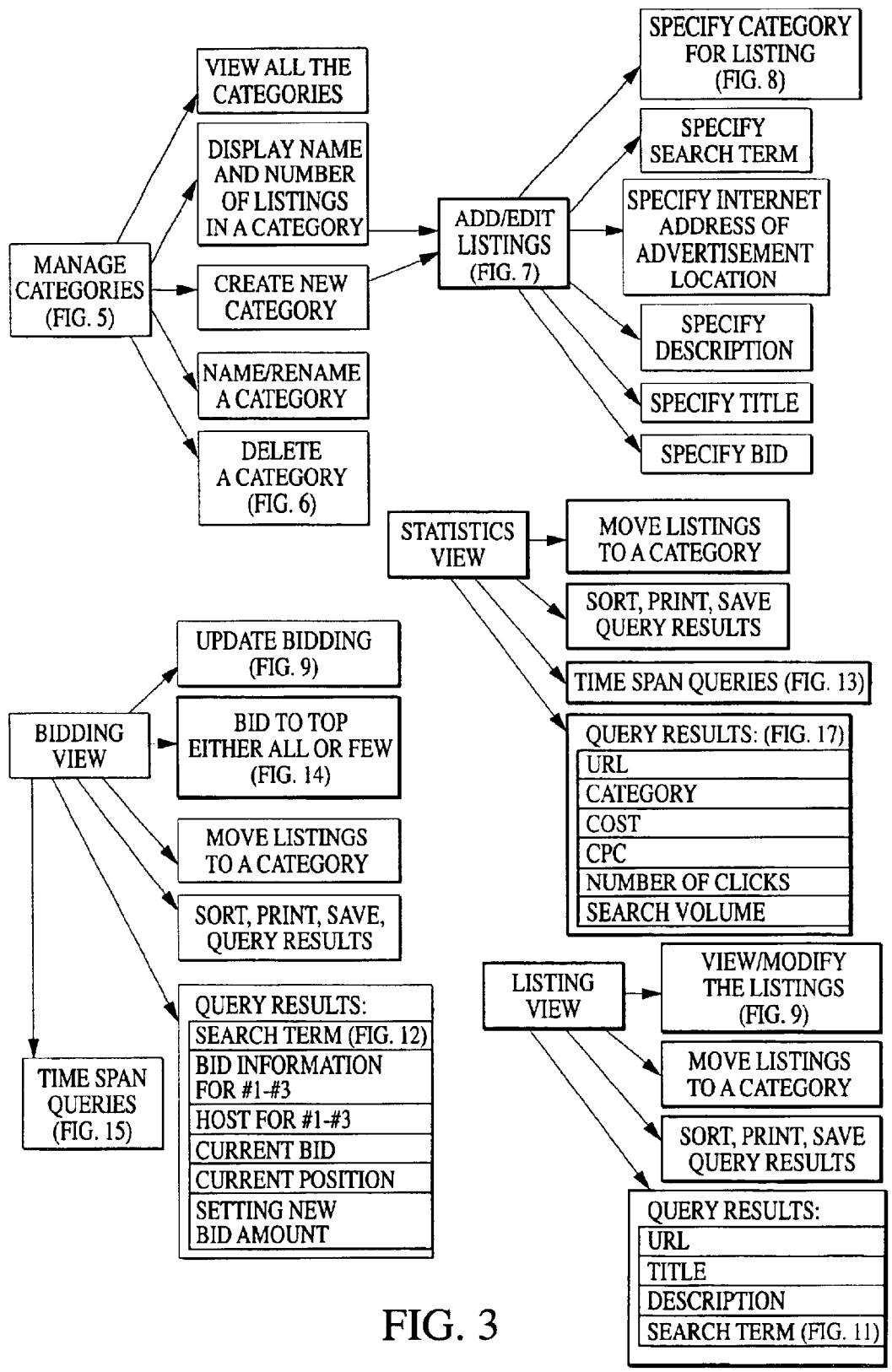
FIG. 3 is a flow diagram that illustrates the functionalities of various interfaces in the search listing management system.

FIG. 3 is a key map diagram that illustrates the functionalities of various interfaces in the Power manager. These functionalities are discussed in detail in following FIG. 5–FIG. 17, and references are provided to the figures which represent the marked feature of the interface in more detail, for example 'Delete Category' functionality has a label FIG. 6, since, that functionality is shown in detail in FIG. 6. The purpose of this FIG. 3 is to give at a glance an overview of functionalities of the Power Manager.

Figure 4:
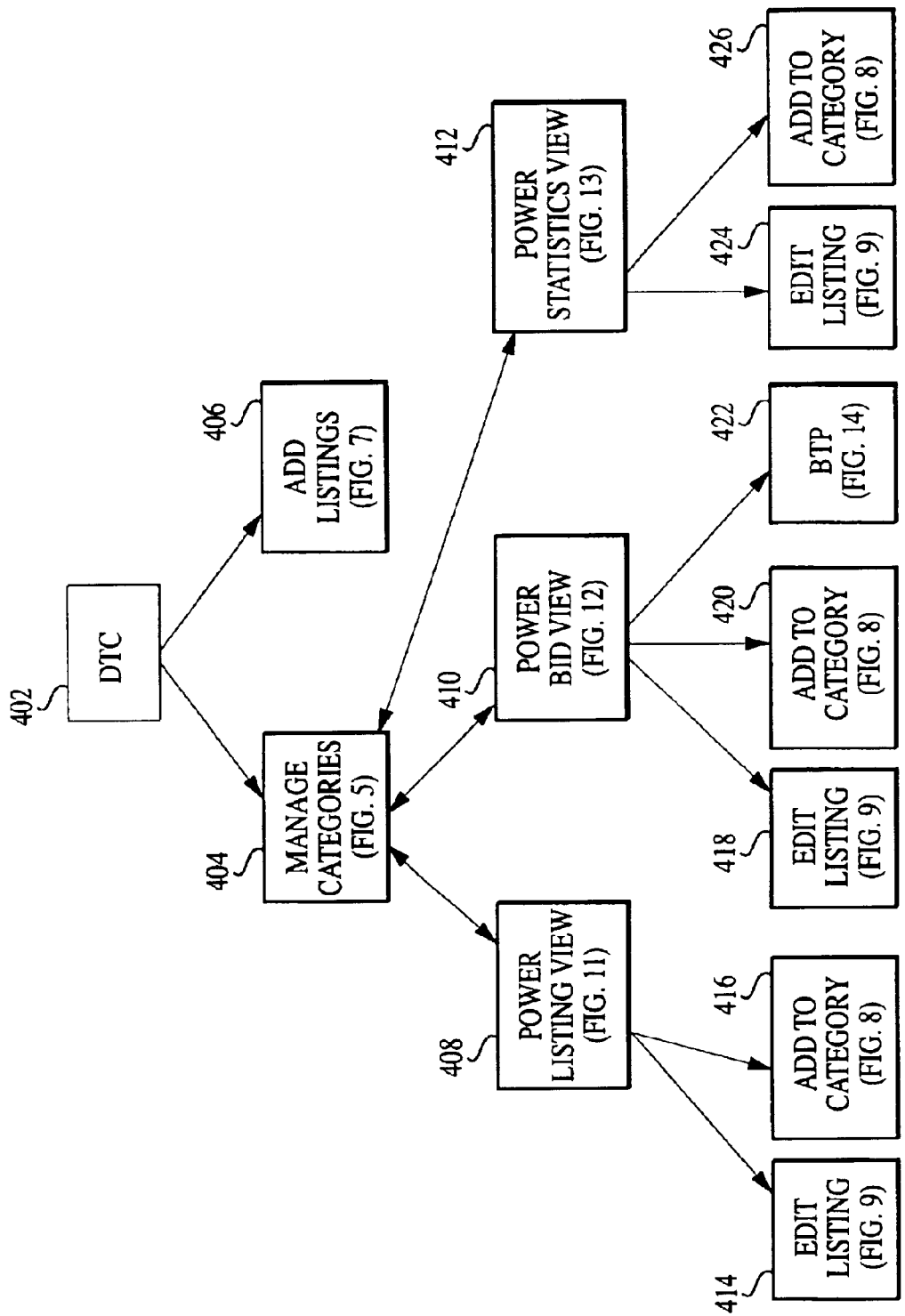
FIG. 4 is a state diagram showing operations performed in the Manage Category choice and in the List View, the Bid View and the Statistics View.

FIG. 4 is a state diagram showing operations performed in the Manage Category choice and in the List View, the Bid View and the Statistics View. At various points in this description, an attempt is made to point the reader to the location identifier of the interface in FIG. 4.

FIG. 4 illustrates a method to allow advertisers to manage search listings by grouping in a pay for placement database search system, along with operating states in a system in accordance with FIG. 2. At block 402, the advertiser logs in to the account on the account management system. The advertiser then makes a selection in regards to the next activity, one of which can be Add Listings activity. By following links from block 402 to block 406, the advertiser is placed in a position to add new listings to the system. The search listings entered by the advertiser will be stored in an Editorial Processing System (EPS) for review by editors. After review, the edited search listings are added to the search listing database with an 'all search listings' category and an 'unassigned listing category'. The Add Listings functionality is described in detail below in conjunction with FIG. 7.

The advertiser can also select 'Manage Categories' option from the account management system by following links from block 402 to block 404. This places the advertiser in a position to manage the categories of search listings in the search database. This interface gives the advertiser the ability to switch between his various accounts using a dropdown menu. This interface enumerates the name of the category and the number of listings in both unassigned and user defined categories. The advertiser can create, name, rename and delete a category from this interface. These functionalities are described below in greater detail in conjunction with FIG. 5.

Alternatively, by following a link from block 404 to block 408, the advertiser is placed in a position to enter the Listing View. In the Listing View, by following a link from block 408 to block 416, the advertiser can select a set of listings for adding the listings to a category. This functionality is described in greater detail below in conjunction with FIG. 8. By following a link from block 408 to block 414, the advertiser can search and edit the listings. These functionalities are described in greater detail in conjunction with FIG. 9. The Listing View is displayed in greater detail in FIG. 11.

The advertiser may also follow a link from block 404 to block 410. In this case, the advertiser is placed in a position to enter the Bid View. In the Bid View, by following a link from block 410 to block 420, the advertiser can select a set of listings for adding the listings to a category. This functionality is described in greater detail in conjunction with FIG. 8. By following a link from block 410 to block 418, the advertiser can search and edit his listings. The Bid View is displayed in detail in FIG. 12. Furthermore, while in the Bid View, the advertiser can also bid a set of listings to top. This functionality is described in greater detail below in conjunction with FIG. 14.

Alternatively, the advertiser may follow a link from block 404 to block 412. In this case, the advertiser is placed in a position to enter the Statistics View. In the Statistics View, by following a link from block 412 to block 426 the advertiser can select a set of listings for adding the listings to a category. This functionality is described in greater detail below in conjunction with FIG. 8. By following a link from block 412 to block 424, the advertiser can search and edit the listings. The Bid View is displayed in detail in FIG. 12.

FIGS. 5–17 are screen shots illustrating operation of a user interface to implement advertiser control of search listings in a pay for placement or other database search system such as the system 200 of FIG. 2. The embodiments of FIGS. 5–17 are illustrative only and many variations of the presentation of the functionality described herein may be substituted. However, components such as the account management server 206 of the search system 200 of FIG. 2 preferably implement a user interface such as the illustrated user interface to allow advertiser control of advertiser search listings. The illustrated functionality may be implemented in one or more software code routines or applications operating on a processing device associated with a database and server system or other device.

Figure 5:
FIG. 5 is a screen shot of one embodiment of a 'Manage-Categories Interface Page' this interface demonstrates the functionality that is used to create, name, and delete a category.
Figure 6:
FIG. 6 is a screen shot of one embodiment of a 'Popup Interface Page' that is displayed as a confirmation page prior to deleting a category.

FIG. 5 is a screen shot of one embodiment of a 'Manage-Categories Interface Page' wherein the heading 502 'manage categories' is selected because the user is at the junction specified in part 404. Under this interface page, an advertiser can switch between his various accounts using a dropdown menu 504, which displays the details of each account of the advertiser such as Account ID, Account Name, Product, and Market. This interface page enumerates the name of the category at heading 506 and, number of listings in both unassigned and user defined categories at heading 508. The advertiser can create a new category by entering the name of the category in input text box 510, and further rename the category by entering the new name at the input text box 514. The advertiser may select to delete a category by selecting a category from a drop down menu 512. Selecting "delete" from the drop down menu 512 directs the advertiser's browser to a pop up interface page, an example of which is shown in FIG. 6. Before the category gets deleted, the advertiser is required to confirm the delete action by clicking 'DELETE' button at 602 in FIG. 6.

Figure 7:
FIG. 7 is a screen shot of one embodiment of a 'Add Listing Interface Page', which illustrates how the listings are added to the system.

In FIG. 7 the user is at the junction specified in part 406. The FIG. 7 is a representation of the add listings interface used in a preferred embodiment of the present invention, which enables the advertiser to add search listings to the system. The add listings interface includes a text box 702, an input text box 704, an input text box 706, a suggestion tool 708, a get current bid tool 710, a bid amount text box 712 a continue button 716 and a continue button 718. In the illustrated embodiment, the advertiser is required to provide several parameters for this listing. The search terms parameter denotes the words of the listing that are compared with a received query from a searcher. For instance, in FIG. 7. the advertiser is attempting to enter a listing for a sofa. The advertiser will input word 'sofa' in the search term text box 702. Then the advertiser will enter the URL for an advertiser web site where the sofa advertisement or other information is located in the input text box 704. Then the advertiser will enter an appropriate title for this listing in the input text box 706. In the current example, an appropriate title would be 'Buying sofas online'. Then the advertiser will input a detailed description of this item or other information in the input text box 714. The advertiser will also enter the bid amount in the bid amount input box 712. In one session, the advertiser will be able to add multiple search listings, and submit the added listings to the system.

The interface also makes available the search term suggestion tool 708 that suggests a search term and get current bid tool 710 that identifies the top forty bids for the search term. As the name suggests, this interface is used to add listings to the interface. Once entered, a listing resides in a category in the system. The search listings entered by the advertiser will be stored in an Editorial Processing System (EPS) and the search listings will be reviewed by editors affiliated with the pay for placement database. After editorial review, the listing is added to the database of search listings and categorized in the 'all search listings' category and an 'unassigned listing category'. For the ease of use, the interface allows the advertiser to copy the title, description, URL and bid from a previous listing by clicking on 'continue adding listings with this information button' 716. Otherwise, the advertiser may choose to continue adding listings using a blank form by clicking on continue button 718.

The ability to group listings facilitates the calculation of the performance metrics for a user defined category, wherein the advertiser can learn more about past performance of a category. The grouping ability further aids in predicting click traffic for a user defined category in the future, for example if market demand of certain kind of medications is increased then the manufacturer of the pharmaceuticals may want to raise his bid to bid to the top for all the medications in certain category. The top position is the most preferred position because the higher the position of the listing in the search results, the more clicks the listing is likely to receive and thereby boost the sale of the medication.

Figure 8:
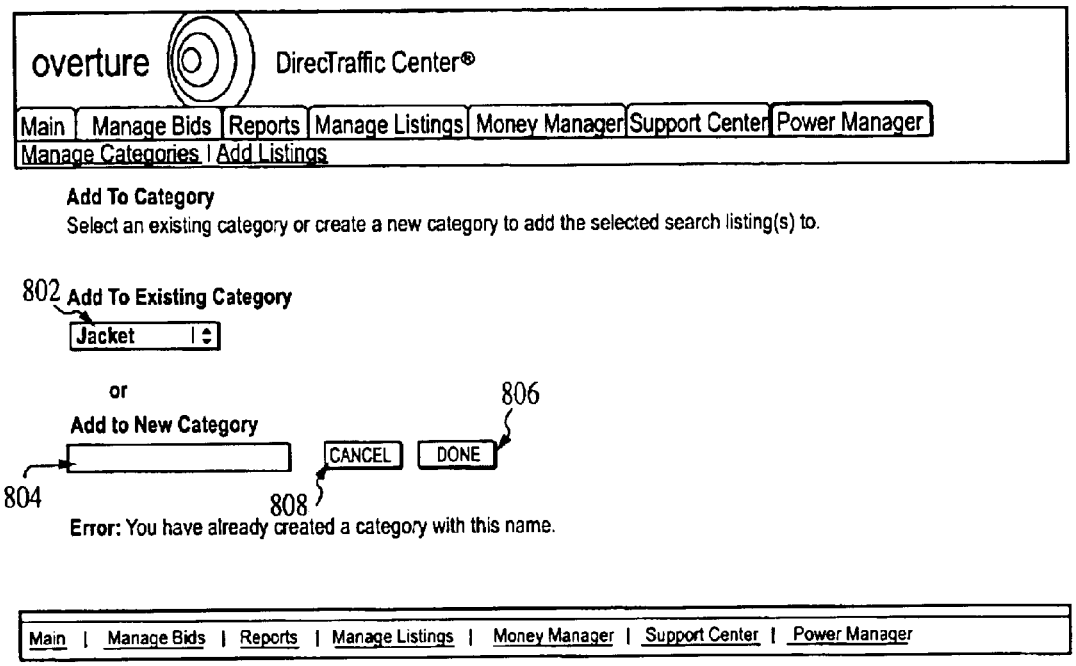
FIG. 8 is a screen shot of one embodiment of a 'Add-to-category Interface Page' representing how a listing is added to a category.

Since all the listings reside in a category, after adding a new listing, the next step is to add the listing to a category. While at position 416 in FIG. 4, the advertiser can move the newly added listing from the unassigned category, to an existing category or alternatively, create a new category and move the listing to that new category. FIG. 8 displays one embodiment of an interface by which the advertiser has a choice to add the listing to an existing category by selecting an existing category from the drop down menu 802. The interface of FIG. 8 also includes a text box 804, a done button 806 and a cancel button 808. The option of creating a new category is exercised by entering the name of the category in the 'Add to new category' text box 804, and then clicking on the done button 806. Any time prior to clicking on 806, the advertiser may abort by clicking on the cancel button 808.

Figure 9:
FIG. 9 is a screen shot of one embodiment of a 'Edit-listings Interface Page', which demonstrate a way to modify certain attributes of a listing.

The 'Edit Listings' at positions 414, 418, 424 in FIG. 4 illustrates a user's ability to modify listings. In FIG. 9, the quick fill box 900 located at the top portion of this interface allows the advertiser to modify an attribute of multiple listings by specifying the value of the attribute at a single location. The advertiser selects a category for the quick-fill operation from a list of user defined categories in the drop down menu 902. The quick-fill functionality allows all the listings in that category to be modified with respect to a URL by providing an intended URL in text box 918. All the search listings in the selected user defined category will contain the modified URL when the advertiser clicks on 'Quick Fill All' button 924. The 'Title' text box 920 and the 'Description' 922 text box can similarly be filled or populated for the selected user defined category.

Alternatively, the advertiser may choose to modify the attributes of each listing individually by providing separate input for each category, by selecting a category from a drop down menu of categories 904. This interface provides the current bid for position for the top three positions, including bid 908, bid 910 and bid 912, along with current bid tool 914 to help the advertiser determine a new bid amount and enter the bid at bid entry box 916. After providing all the information the advertiser can submit the input by clicking the 'SUBMIT CHANGES' button 926.

After submitting changes, a confirmation is provided to the user. FIG. 10 shows the edit receipt confirmation interface with 'Search Term' 1002, URL 1004 and 'Current Bid' 1006, after the modifications are submitted.

Figure 11:
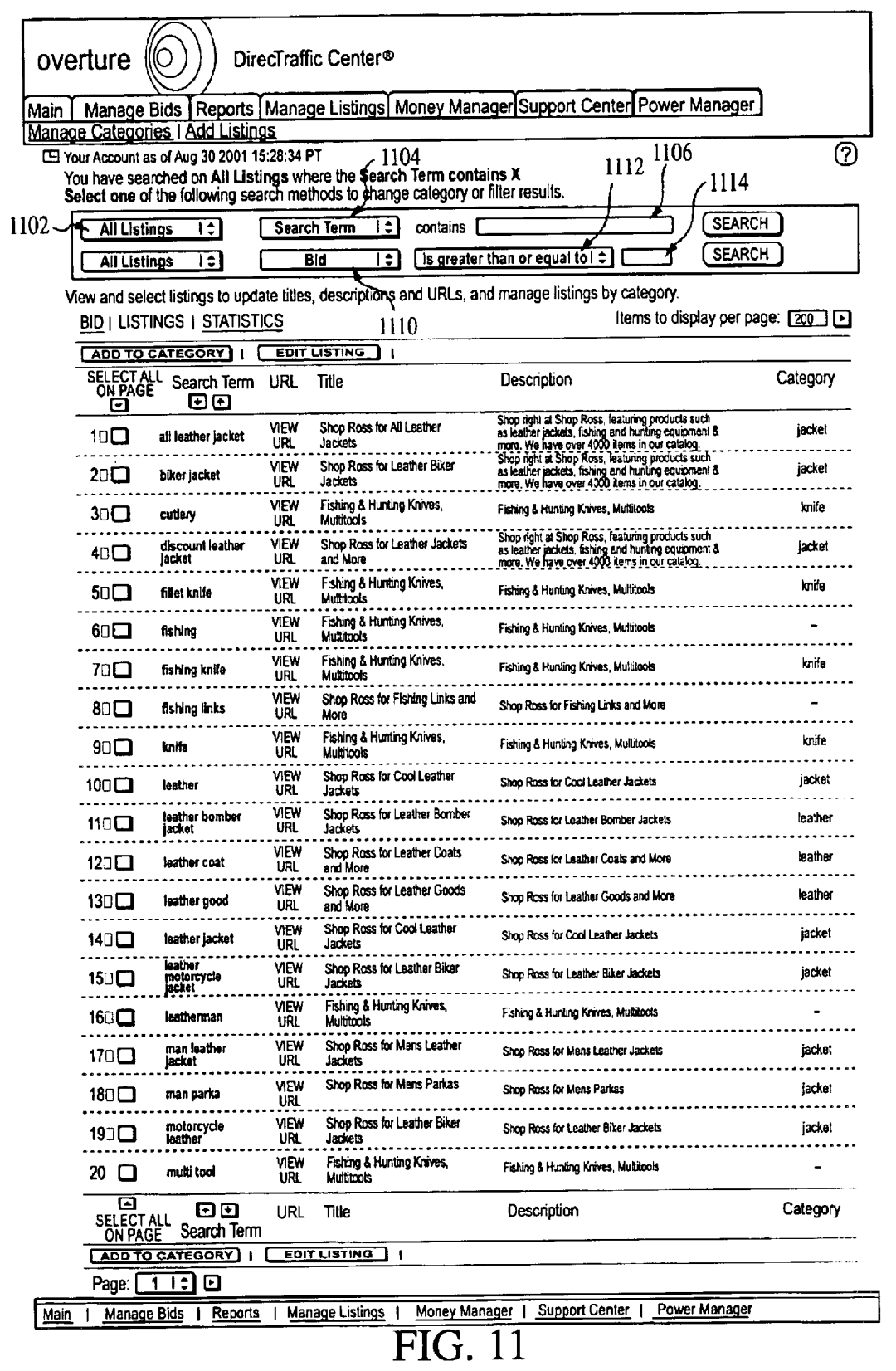

In FIG. 11, the user is at the junction specified in position 408 of FIG. 4. FIG. 11 shows a listings wide search page. The search page allows an advertiser to enter elements of a search query to search and organize the advertiser's search listings, including searching by category. The search page includes a drop down box 1102, a drop down box 1104, a text input box 1106, a drop down menu 1110, a numeric operator comparison drop down menu 1112, a input box 1114. In FIG. 11, the interface displays a typical listings query page wherein drop down box 1102 enables the advertiser to select either all listings or the listings in the user defined category or the listings in the unassigned category. Next, a user selects from the search term drop down box 1104. The list of choices under this menu is illustrated at drop down menu 1202, FIG. 12. This drop down menu 1202 includes: Search Term, URL, Description or title which may be used as search criteria.

The text input box 1106 allows the advertiser to enter a text string to be compared using the search criteria previously entered at drop down menu 1104. The advertiser can also run a bid based query by selecting a time span at drop down menu 1110. A list of choices which may be provided under Bid query drop down menu 1110 is illustrated at drop down menu 1502 in FIG. 15. There, the possible search items include number of clicks, total amount spent, and price per click for various time spans. In numeric operator comparison drop down menu 1112, the advertiser selects a filter from the list of choices under this menu. One example of the possible list of choices is shown at 1602, FIG. 16, and includes entries 'is greater than or equal to' and 'is less than or equal to'. Next, the advertiser enters a numeric value in the input box 1114 to be compared with the numeric value of input in the drop down menu 1110. The search query is submitted by clicking a search button. After processing, the query results are displayed to the advertiser in tabular form including the Search Term, URL, Title, Description and name of the category for each search listing. The advertiser can click on the View URL icon to go to the advertiser's page that is advertised by the listing.

Figure 12:
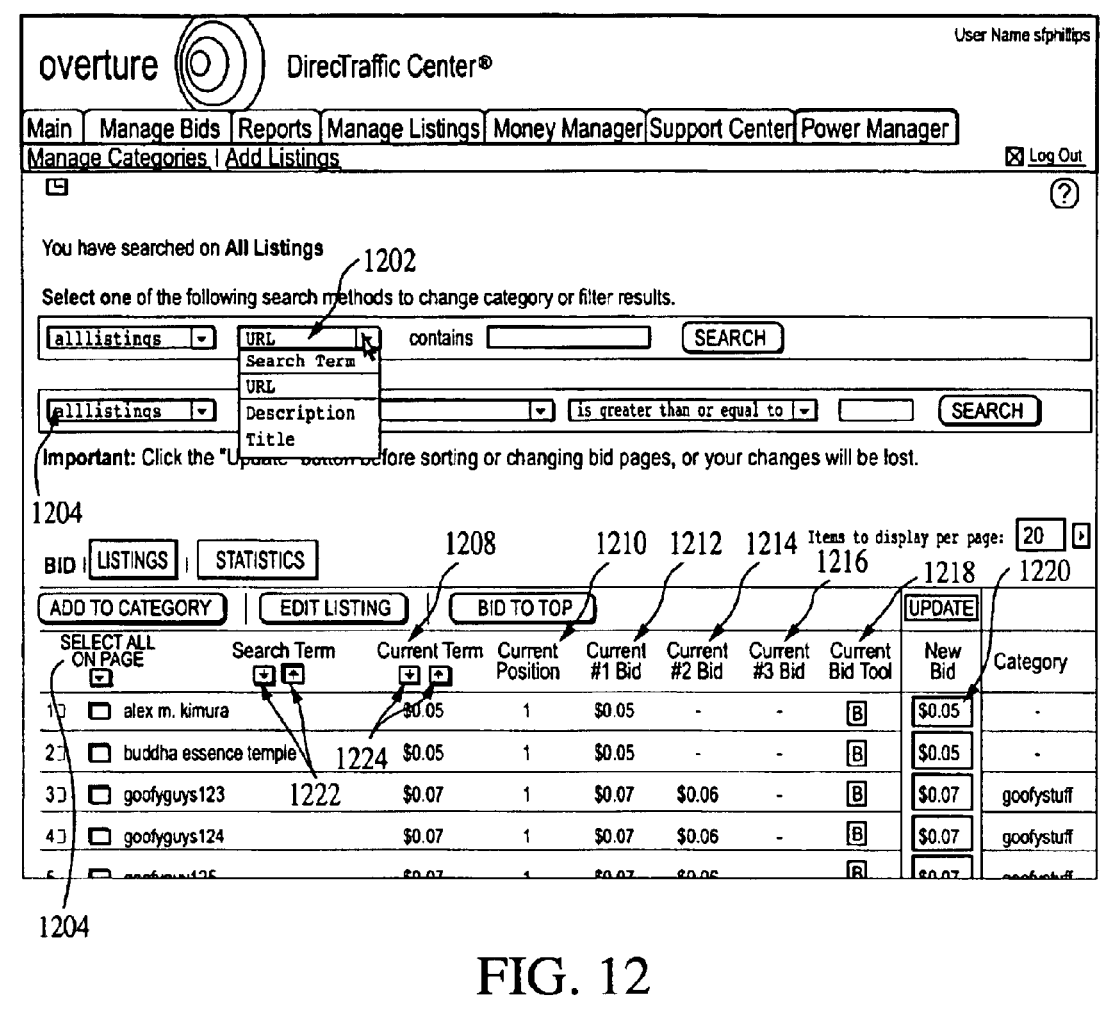

In FIG. 12, the user is at the junction specified as position 410 in FIG. 4. FIG. 12 shows one embodiment of a screen shot of a Query Criteria Selection Interface page. The page of FIG. 12 includes a drop down menu 1202, a select all listings link 1204, a current bid selector 1208, a current position selector 1210, a current first bid 1212, a current second bid 1214, a current third bid 1216, a current bid tool 1218, a text box 1220, alphabetical sort controller 1222, and bid search controller 1224. In the screen shot of FIG. 12, the interface displays a typical Bid Query Criteria selection page. The BID option is selected which denotes that the advertiser is exploring the edit listing option under the Bid View as illustrated at position 418 in FIG. 4. The advertiser can select at drop down menu 1202, one of the following search criteria: Search Term, URL, Description or Title. This interface provides a current bid selector 1208 for each listing as well as a current position selector 1210 for the listing. The interface also provides the position for top three bids, including first bid 1212, second bid 1214 and third bid 1216, along with a current bid tool 1218 to help the advertiser determine a new bid amount and enter at text box 1220. The advertiser further can select all the listings at once by clicking on the downward pointing arrow at the select all listings link 1204. Selecting all listings allows the user to perform one operation on all the selected listings via using the quick fill operation described herein. The advertiser can sort the query results alphabetically by clicking on either upward or downward pointing arrows of the alphabetical sort controller 1222 located under the title Search Term. The advertiser can also sort the query results in ascending or descending order by clicking on either upward or downward pointing arrow of the bid search controller 1224 located under the title Current Bid.

Figure 15:
FIG. 15 is a screen shot of one embodiment of a 'Bid Statistics Timeframe Query Interface Page', which is a typical Query page in the Bidding View.
Figure 16:
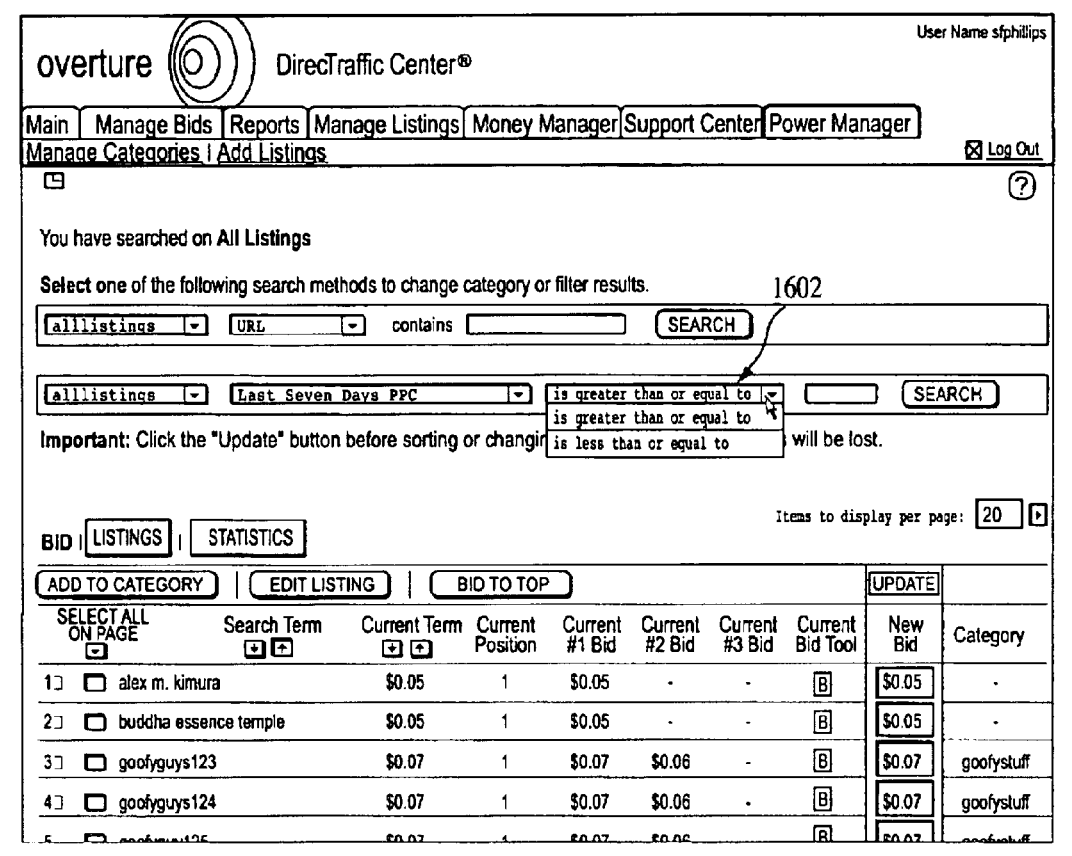

The bid view of FIG. 12 also enables the advertisers to run a query by selecting one of the following search criteria from a drop down menu 1502 of FIG. 15: number of clicks, Total amount spent, and price per click for various time spans. In the bid view, the queries can be searched using the numeric comparison operators such as 'less than or equal to' or 'greater than or equal to' from the drop down selection menu 1602 in FIG. 16.

In FIG. 14, the user is at the junction specified as position 422 in FIG. 4. The advertiser can select certain search listings to control the position at which one or more search listings are displayed. This is provided by the bid to top functionality, which in the illustrated embodiment allows the advertiser to select the first, second or third ranked positions for a search listing. The top position is generally the most preferred position or ranking because higher ranked search listings will be seen by more users and will therefore generate more clicks. The bid to top functionality allows an advertiser to quickly and easily move search listings to top positions.

In a first option, the advertiser can select "bid to top unlimited." In this option, the advertiser specified a desired rank for one or more search listings. The system will always try to position the selected search listing at the desired rank specified by the advertiser. This is done without regard to the amount of the bid required to achieve the specified rank. In the second option, the advertiser can select the "bid to top with cap" option. Under this option, the advertiser specifies both desired rank and a bid cap for one or more search. The system tries to position the search listings at the desired rank without exceeding the bid cap. Rules and exceptions are implemented to address tie conditions and other situations. A more detailed explanation of the bid to top functionality may be found in U.S. patent application Ser. No. 09/993,926, entitled POSITION BIDDING IN A PAY FOR PLACEMENT SEARCH SYSTEM, filed on Nov. 13, 2001 and commonly assigned to the assignee of the present application, which application is incorporated herein in its entirety by this reference.

Figure 13:
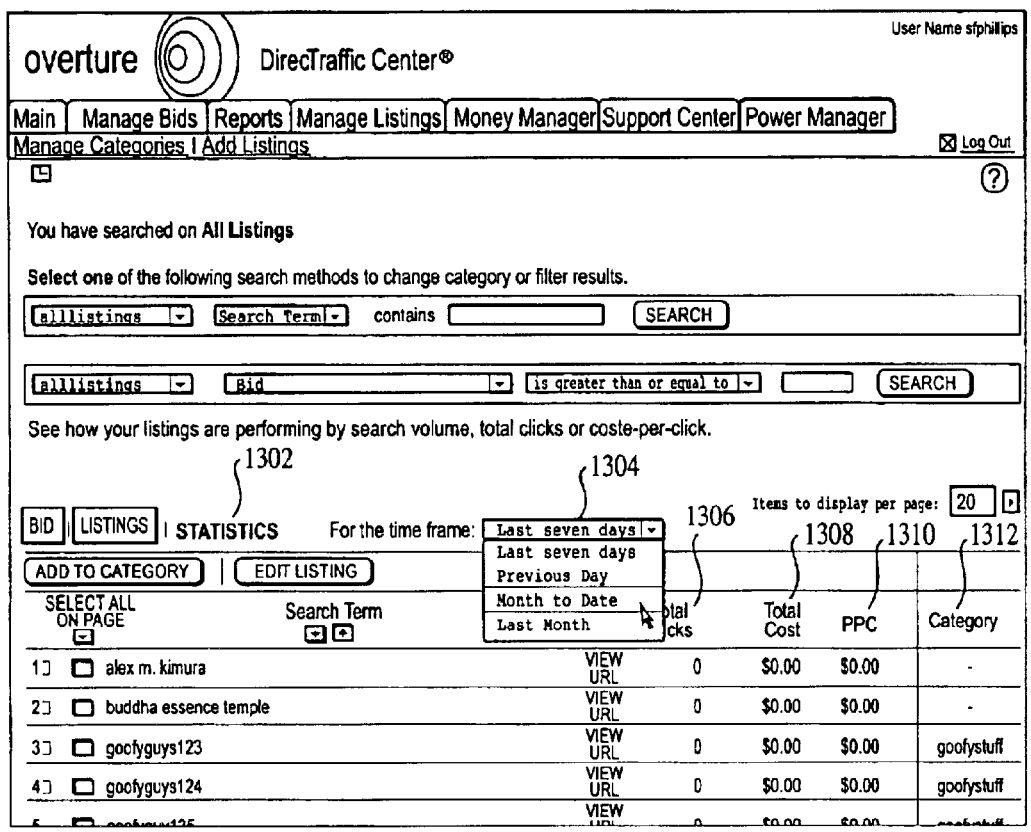
FIG. 13 is a screen shot of one embodiment of a 'Bidding Time span Selection Query Interface Page', which is a typical Query page in the Statistics View.

FIG. 13 is a screen shot showing one embodiment of a statistics view query page. This page allows an advertiser to review statistics related to the advertiser's search listings. The query page includes a statistics view 1302, a drop down menu 1304, headings 1306, 1308, 1310 and a category indication 1312 In the query page of FIG. 13, the user is at the junction specified as position 412 in FIG. 14. The Statistics View 1302 aids the advertiser in reviewing several features of a search listing. These are illustrated in the embodiment of FIG. 13 at total cost heading 1308, total clicks heading 1306 and price per click heading 1310 for a listing, along with the listing's category indication 1312. The statistics may be shown for specified time frame specified by selection in a drop down menu 1304 as shown in FIG. 13. In the presently preferred embodiment, a time frame can be either previous day, month to date or last month. Other time frames or search parameters may be substituted as well.

Figure 17:
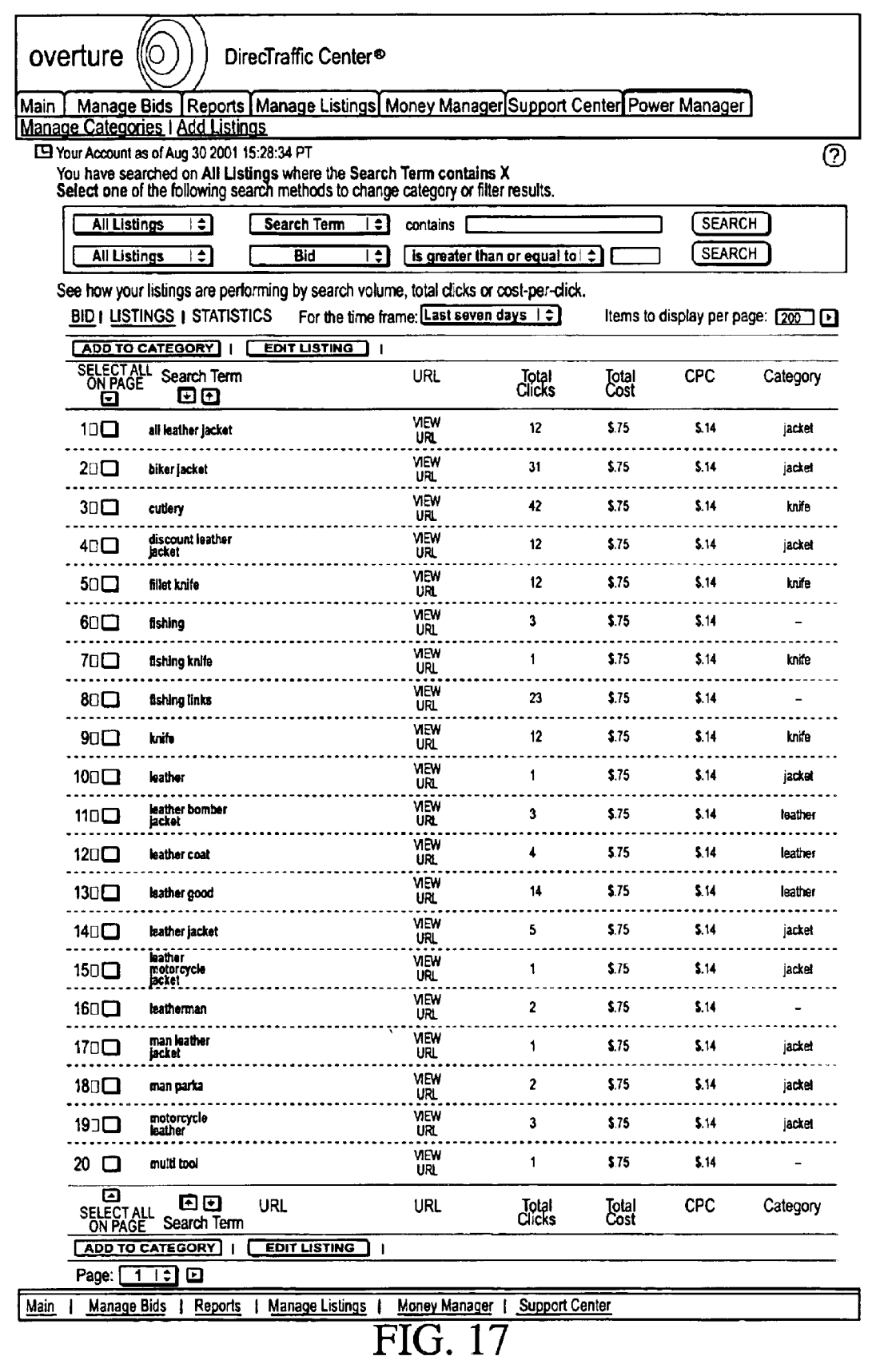

FIG. 17 displays a typical query results for a statistics query that can help the advertiser to have at a glance a view of which of the categories are most frequently clicked on and how much was the price per click etc. Such information can be used by the advertiser to tailor future use of the pay for performance search system.

In one embodiment, the search and query views provide a particular convenience feature for the advertiser. In this embodiment, these views provide a user interface which includes a display area configured to display a plurality of advertiser search listings. For each advertiser search listing, a common hyperlink is displayed with the advertiser search listing. The user interface further includes apparatus such as program code for displaying a URL associated with a particular advertiser search listing upon a mouseover of the common hyperlink displayed with the particular advertiser search listing. A mouseover is movement of the cursor or mouse over or in the vicinity of the link.

For example, in the screen shot of FIG. 11, each search listing is arranged down the screen page. Each search listing includes a hyperlink with the text "view URL." In the illustrated embodiment, this hyperlink is common to all search listings but other types of hyperlinks which vary or convey other information could be substituted. When an operator's cursor or mouse is brought in the vicinity, a pop up display appears next to the cursor and shows in a box text defining the URL associated with that particular search listing. Clicking on the hyperlink directs the user's browser to that URL. In the preferred embodiment, a new window is opened at the specified URL.

This provides a very convenient way for an advertiser editing his listings to identify dead or incorrect links. Many URLs are too long to conveniently display on the search listing page. By substituting the common hyperlink, the URL information is readily available but without cluttering the display screen. The ability to click through the link to the associated URL provides convenience and time savings to the advertiser managing his search listings.

From the foregoing, it can be seen that the present invention provides method and apparatus for assisting advertisers to efficiently manage search listings via grouping in a pay for placement database search system. Advertisers, including advertisers who maintain large numbers of listings in a pay for placement or other database search system can group their listings in categories to assist in managing information about these listings, including bid amounts. The system includes searching and sorting tools to further simplify the manipulation of the search listings.

While a particular embodiment of the present invention has been shown and described, modifications may be made. It is therefore intended in the appended claims to cover such changes and modifications, which follow in the true spirit and scope of the invention.

What is claimed is:

1. A method for managing advertiser search listings in a pay for placement database search system, each search listing including at least one search term and a network location, the method comprising:
   storing a database of search listings, at least some of the search listings being associated with respective advertisers, the search listings being searchable in response to a query received from a searcher;
   grouping advertiser search listings into advertiser defined categories, the advertiser defined categories being independent of search listing search terms;
   receiving advertiser category data defining an advertiser category; and
   creating an advertiser category in response to the advertiser category data.

2. The method of claim 1 further comprising:
   naming the category in response to the advertiser category data.

3. The method of claim 2 further comprising:
   renaming the category in response to the advertiser category data.

4. The method of claim 1 further comprising: receiving advertiser category data defining an advertiser category; and adding a listing to a category defined by the advertiser category data.

5. The method of claim 1 further comprising:
   receiving advertiser category data defining one or more advertiser categories: and
   moving an advertiser search listing between an advertiser category and another category in response to the advertiser category data.

6. The method of claim 5 wherein moving the advertiser search listing comprises:
   moving the search listing between the advertiser category and one of an unassigned category and another advertiser category.

7. The method of claim 1 further comprising:
   modifying an attribute of a plurality of advertiser search listings grouped in a common advertiser defined category in response to a modification specified by the advertiser at a single location.

8. The method of claim 7 wherein modifying an attribute comprises at least one of:
   modifying a Uniform Resource Locator CURL),
   modifying a Title, and
   modifying a category
   for the plurality of advertiser search listings in a specified common advertiser defined category in response to the modification specified by the advertiser.

9. The method of claim 1 further comprising: receiving a search query from a searcher;
   searching search listings of the database in response to one or more search criteria specified by the searcher in the search query; and
   placing the matching search listings in a search result list page in response to bid amounts specified by the respective advertisers; and
   providing the search result list page including the matching search listings to the searcher.

10. A database management method for an advertiser to manage advertiser search listings on a pay for placement database search system, the method comprising:
    storing a plurality of search listings in a database, each search listing being associated with a respective advertiser and having at least one associated search term;
    receiving a category indication for one or more search listings from the respective advertiser associated with the one or more search listings;
    using the category indication to temporarily associate the one or more search listings for common processing by the pay for placement database search system; and
    subsequently, operating commonly on the one or more associated search listings in response to database management operations of the respective advertiser.

11. The method of claim 10 wherein the category indication comprises a category name.

12. A search listing management method for a pay for placement database system, the method comprising:
    storing in a database search listings associated with advertisers, each search listing including a searchable search term:
    processing search queries to the database;
    providing information about processed search queries grouped in accordance with advertiser defined search listing categories which are independent of search listing search terms, including
       receiving time windowing information from the advertiser; and
       providing information about access to search listings of the advertiser during a time window defined by the time windowing information.

13. The method of claim 12 wherein providing information comprises:
    providing statistical information about one or more of accessed search terms of the advertiser;
    accessed uniform resource locators of the advertiser; and
    categories of search listings of the advertiser.

14. The method of claim 13 wherein providing information composes:
    providing statistical information about one or more of cost per click information for search listings of the advertiser; and
    total click information for the search listings of the advertiser.

* * * * *